United States Patent [19]

Aparici

[11] Patent Number: 5,588,296

[45] Date of Patent: Dec. 31, 1996

[54] FUSION HEAT RECOVERY AND COMBUSTION GASES FILTERING SYSTEM WITH ELECTRIC POWER PRODUCTION

[75] Inventor: Antonio N. Aparici, Villafames, Spain

[73] Assignee: Colorobbia Espana, S.A., Villafames, Spain

[21] Appl. No.: 359,906

[22] Filed: Dec. 20, 1994

[30] Foreign Application Priority Data

Dec. 20, 1993 [ES] Spain ......................... 9302634

[51] Int. Cl.$^6$ .................................. F01K 25/00
[52] U.S. Cl. ................. 60/671; 60/676; 65/134.6; 110/216
[58] Field of Search ............... 60/676, 671; 432/69, 432/72; 110/216; 65/134.6

[56] References Cited

U.S. PATENT DOCUMENTS

| | | | |
|---|---|---|---|
| 3,592,453 | 7/1971 | Jager | 432/69 |
| 4,977,837 | 12/1990 | Roos et al. | 110/216 |
| 5,133,943 | 7/1992 | Abdulally | 110/216 |
| 5,272,879 | 12/1993 | Wiggs | 60/676 |

*Primary Examiner*—Leonard Heyman
*Attorney, Agent, or Firm*—Helfgott & Karas, PC

[57] ABSTRACT

In a combustion gas heat recovery plant having a plurality of ovens, each oven is provided, at an exhaust passage thereof, with an operative filtering unit. Each operative filtering unit has a heat exchanger receiving fumes from the oven, cooling the same and thereby heating water or any other suitable fluid flowing therein. A filter receives the cooled waste products from the heat exchanger and filters the same to recover the waste products which are sent back to the oven and thus recycled. The hot water from the heat exchangers is fed into a heat transmitting circuit which is connected with another heat exchanger positioned at an output thereof and connected to an organic cycle power plant which has a secondary circuit using a high molecular mass organic fluid flowing therethrough to drive a turbine which drives an alternator which generates electric power.

3 Claims, 1 Drawing Sheet

FUSION HEAT RECOVERY AND COMBUSTION GASES FILTERING SYSTEM WITH ELECTRIC POWER PRODUCTION

FIELD OF THE INVENTION

The present invention relates to a new heat recovery and gases filtering system at the output of industrial fusion ovens with which a high yield is achieved in the production of electric power, and the fumes are perfectly scrubbed and the waste products obtained are recyclable.

The process subject hereof stems from a special application in the glass-ceramics and chemical industry but is equally applicable in a different field where a similarly high level of performance is required.

BACKGROUND OF THE INVENTION

Combustion fumes in industrial fusion ovens are currently either let off directly into the atmosphere, with the problems this entails from the standpoint of both environmental pollution and waste of energy, or go through a filtering stage to be scrubbed, in which event they must first pass through a heat exchanger in which the heat energy of the fumes is extracted in order to cool the same down and enable their mechanical filtering using conventional cap filters.

The heat absorbed by the exchanger can be used directly or indirectly, whereas the waste products extracted from fumes can be disposed of or recycled.

In certain industrial fields, however, for instance when obtaining an enamelling frit, within the aforesaid ceramic field, various ovens need to be used, each of which produces a particular kind of enamel. This means that with current filtering systems for combustion gases, the waste products are mixed and, being different per se, since originating in ovens using likewise different raw materials, there is no way that they can be reused, wherefore the said waste products must be thrown out.

Bearing in mind that a normal ceramic enamelling plant uses twelve ovens and each oven generates some 70 kg/day of waste products carried by the exhaust gases, clearly the amount of raw material wasted is significant and it is extremely important for the same to be recyclable.

SUMMARY OF THE INVENTION

The heat recovery and combustion gases filtering system subject of the invention has been devised in order to fully solve the foregoing problems, on the one hand making the most of the energy and on the other enabling full recycling of the waste products obtained from filtering.

More specifically and in order to achieve the above, the system subject hereof is based upon the provision of an operative filtering unit for each oven used in the plant, obviously working with the respective heat exchanger allowing such filtering to be carried out under the best possible conditions, such operative unit being located over the oven exhaust passage as such to obtain hot water using such exchanger, at a temperature ranging between 90° and 150° C., and cold fumes allowing flexible bag or cap filters to be used, from which waste products are obtained that are recyclable back to a specific and unitary oven, since originating therein.

The various exchangers working with the respective ovens are interconnected in parallel and associated to a joint circuit that has a second heat exchanger that relates the circuit, which is preferably a water circuit, to a second circuit wherein a high molecular mass organic fluid flows, in charge of moving a turbine and through the same a respective alternator generating electric power, i.e. constituting an organic cycle power plant.

DESCRIPTION OF THE DRAWINGS

In order to provide a fuller description and contribute to the complete understanding of the characteristics of this invention, a single sheet of drawings is attached to the specification which, while purely illustrative and not fully comprehensive, contains the single figure (FIG. 1) that schematically shows a fusion heat recovery and combustion gases filtering system, with electric power production, wherein two ovens are used.

PREFERRED EMBODIMENT OF THE INVENTION

Figure 1:
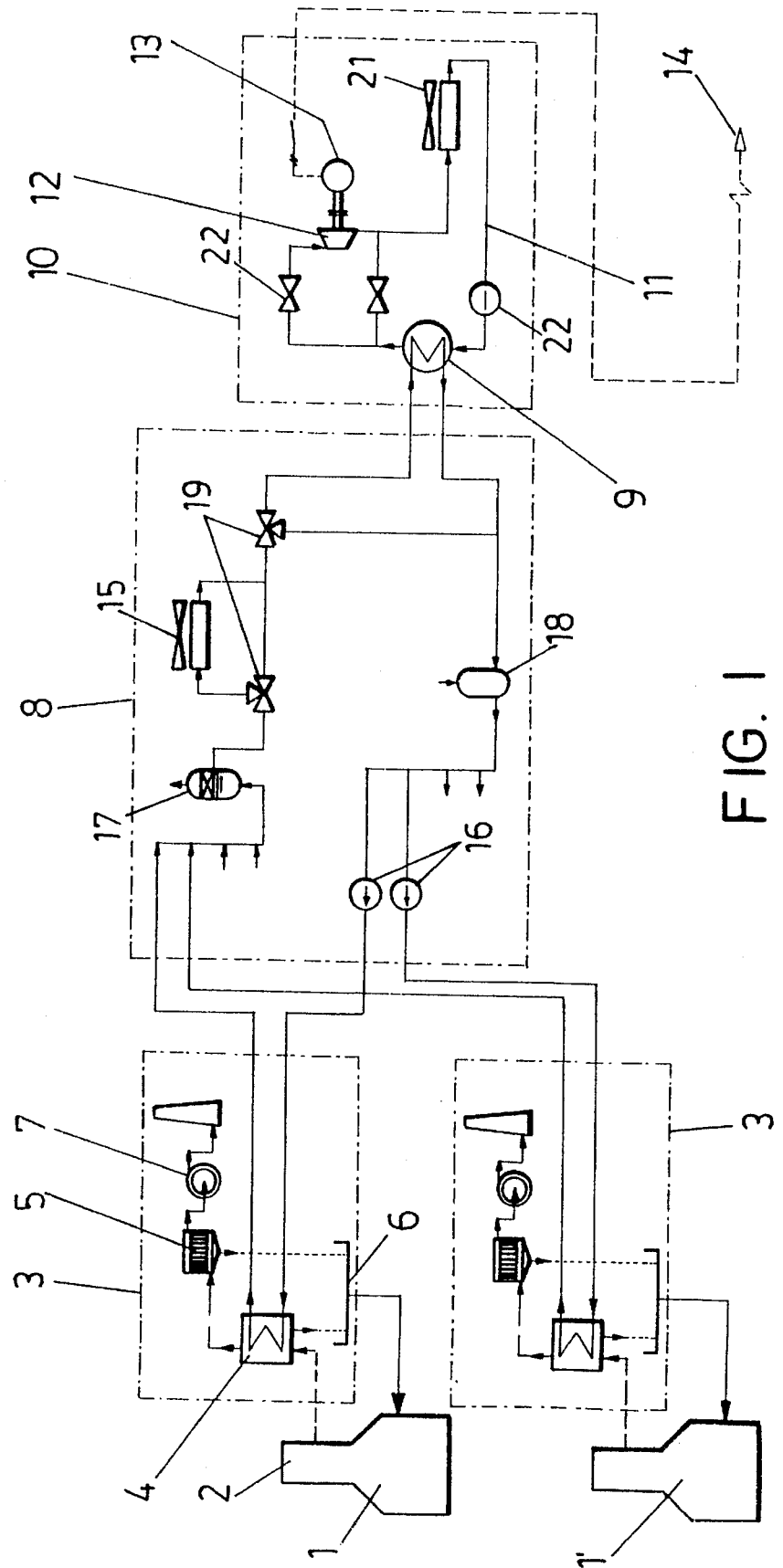

With reference to the figure, it is clear that the system subject hereof is specifically applicable to plants using a variable number of ovens (1—1'), the system comprising the provision over the exhaust passage (2) as such in every oven (1) of an operative unit (3) working with a heat exchanger (4) to cool the gases or fumes down to a suitable temperature in order for the same to be filtered as best as possible in a self-cleaning textile bag or cap filter (5) in such a way that the waste products extracted by the filter (5) can reach a manifold (6) from which they can again move into the oven (1) to be recycled, according to the arrow shown in the figure, the filter (5) working with a conventional aspirator (7) that expedites the flow of the gases.

The said exchanger (4) is associated to a circuit (8), preferably a water heat transmitting circuit, although oil or heat transmission fluid can also be used, all the operative units (3) of the various ovens (1) meeting at this water circuit (8), which includes an air cooler 15, pumps 16, condensate accumulators 17 and 18 and valves 19.

This water circuit (8) has associated a second exchanger or output exchanger (9) through which the water or other heat transmission fluid, heated in the input exchangers (4) to a temperature ranging between 90° and 150° C. transmits its heat to a power plant (10), with a circuit (11) that has a high molecular mass organic fluid flowing therethrough to drive a turbine (12) to which an alternator (13) is associated for the generation of output electric current (14). Circuit 11 also has an air cooler 21 and valves 22, 23.

More specifically, the exchangers (4) and (9) have self-cleaning tubular bundles, and use gas flows through the exchange surface that enable self-cleaning with mechanical means.

The powder contained in the exhaust gases of every oven can thereby be separated and hence be used in the relevant oven, thereby increasing frit production and drastically reducing the amount of waste powder to be disposed of.

The plant layout is at the same time not adversely affected by the presence of long and large diameter insulated passages carrying the gases from the ovens to the single filtering sections. The heat energy carried by combustion gases is at the same time made the most of with a high level of electric power production.

We feel that the description need not be extended any longer for any expert in the art to have grasped the full scope of the invention and the advantages it offers.

The materials, shape, size and layout of the elements may be altered provided that this entails no modification of the essential features of the invention.

The terms used to describe the invention herein should be taken to have a broad rather than a restrictive meaning.

I claim:

1. A fusion heat recovery and combustion gases filtering system with electric power production, applicable to a ceramic enamelling plant and the like having a plurality of ovens (1), the system comprising a plurality of operative filter units (3), each operative filtering unit (3) of said plurality including a filter (5), an input heat exchanger (4) receiving fumes from a respective oven to cool the fumes down to an appropriate temperature for filtering the fumes in said filter, said filter being selected from a group consisting of a textile bag and a cap filter in which a powder enamel is recovered to be sent back to the respective oven (1) and hence recycled; a heat transmitting circuit (8) coupled to input exchangers (4) of all operating filtering units (3) of said ovens to receive hot heat transmission fluid from and send cooled heat transmission fluid to said input heat exchangers (4); and an organic cycle power plant (10), the operative filtering units (3) cooperating with the respective ovens (1) having input heat exchangers (4) thereof connected in parallel to said heat transmitting circuit (8) wherein a second exchanger (9) is provided that works as an output exchanger for transmitting heat received from said hot heat transmission fluid from said input heat exchangers (4) and absorbed thereby to said organic cycle power plant (10) which generates electric power.

2. The fusion heat recovery and combustion gases filtering system, as in claim 1, wherein the operative filtering units (3) are each installed at an actual exhaust passage (2) of the respective oven (1) and connected by passages of small diameter to the heat transmitting circuit (8) and through the heat transmitting circuit to the output exchanger (9).

3. The fusion heat recovery and combustion gases filtering system, as in claim 1, wherein the power plant (10) is provided with a secondary fluid carrying circuit (11) for the output exchanger (9) through which a high molecular mass organic fluid flows, said secondary fluid carrying circuit (11) being provided with a turbine (12) for driving an alternator (13) that generates the electric power into which heat energy extracted from the fumes as they leave the ovens (1) is transformed.

\* \* \* \* \*